(12) United States Patent
Abe et al.

(10) Patent No.: US 7,862,953 B2
(45) Date of Patent: Jan. 4, 2011

(54) COMPOUND, SOLID POLYMER ELECTROLYTE MEMBRANE, ELECTROLYTE MEMBRANE-ELECTRODE ASSEMBLY, AND SOLID POLYMER FUEL CELL

(75) Inventors: Keiko Abe, Kawasaki (JP); Motokazu Kobayashi, Yokohama (JP); Makoto Kubota, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1055 days.

(21) Appl. No.: 11/610,965

(22) Filed: Dec. 14, 2006

(65) Prior Publication Data
US 2007/0148519 A1 Jun. 28, 2007

(30) Foreign Application Priority Data
Dec. 27, 2005 (JP) .............................. 2005-375170

(51) Int. Cl.
*H01M 8/10* (2006.01)
(52) U.S. Cl. ...................... 429/491; 429/479; 429/400; 429/304; 429/310; 429/314; 429/317; 521/27; 521/25
(58) Field of Classification Search .................. 521/27, 521/25; 429/491, 479, 400, 304, 310, 314, 429/317
See application file for complete search history.

(56) References Cited

U.S. PATENT DOCUMENTS

| 6,339,038 | B1 | 1/2002 | Tada et al. | |
| 2005/0113530 | A1 | 5/2005 | Kim et al. | ................. 525/333.3 |
| 2007/0054194 | A1 | 3/2007 | Zhang et al. | |

FOREIGN PATENT DOCUMENTS

| JP | 2-111440 | A | 4/1990 |
| JP | 2000-003712 | A | 1/2000 |
| JP | 2004-342537 | | 12/2004 |
| JP | 2005-139450 | | 6/2005 |

OTHER PUBLICATIONS

Kobunshi Gakkai Yokosyu (Polymer Preprints, Japan, Japanese Ed.) 1999, 48(10), 2393-94.

*Primary Examiner*—Laura S Weiner
(74) *Attorney, Agent, or Firm*—Fitzpatrick, Cella, Harper & Scinto

(57) ABSTRACT

An unsaturated compound including a urethane bond in a main chain and a sulfonic acid group, a phosphoric acid group, an alkylsulfonic acid group, or an alkylphosphoric acid group on a benzene ring in a side chain is provided. In addition, a solid polymer electrolyte membrane containing a compound prepared by polymerizing the above-mentioned compound and an electrolyte membrane-electrode assembly including diffusion layers adhered on both surfaces of the electrolyte membrane are provided. Furthermore, a solid polymer fuel cell using the electrolyte membrane-electrode assembly is provided.

6 Claims, 1 Drawing Sheet

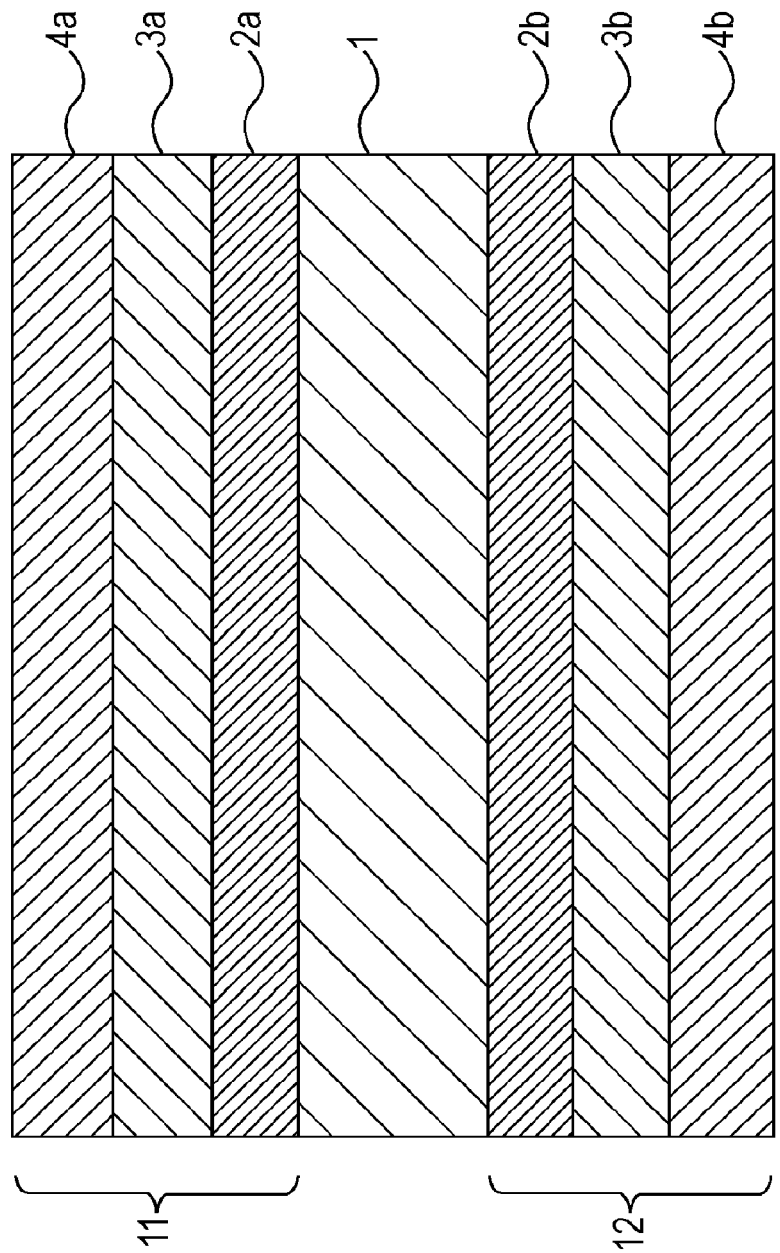

COMPOUND, SOLID POLYMER ELECTROLYTE MEMBRANE, ELECTROLYTE MEMBRANE-ELECTRODE ASSEMBLY, AND SOLID POLYMER FUEL CELL

BACKGROUND OF THE INVENTION

1. Field of the Invention

The present invention relates to compounds, solid polymer electrolyte membranes, electrolyte membrane-electrode assemblies, and solid polymer fuel cells.

2. Description of the Related Art

Perfluoro-based proton conductive polymers, such as Nafion (DuPont) and non-perfluoro-based proton conductive polymers not containing fluorine, have been used as solid polymer electrolyte membranes in fuel cells.

Nafion is a copolymer of perfluorovinyl ether containing a sulfonic acid group and tetrafluoroethylene. It forms an electrolyte membrane having a high proton conductivity.

However, Nafion has a problem in that when it is employed in a direct fuel cell that uses a liquid fuel, such as methanol, the fuel permeability (crossover) is significantly large. Therefore, the energy efficiency is insufficient.

With regard to a solid polymer electrolyte membrane formed of a non-perfluoro-based proton conductive polymer not containing fluorine, a copolymer of a phenylmaleimide derivative having high mechanical strength and a methacrylic acid monomer containing an ion-exchange group has been suggested (Kobunshi Gakkai Yokosyu (Polymer Preprints, Japan, Japanese Ed.) 1999, 48(10), 2393).

However, there is a problem in that the membrane formed of the copolymer of a high mechanical strength phenylmaleimide and a methacrylic acid monomer containing an ion-exchange group cannot readily achieve favorable proton conductivity.

SUMMARY OF THE INVENTION

In order to solve the above-mentioned problems, the present invention provides novel compounds to be used for preparing solid polymer electrolyte membranes that prevent fuel crossover while having both superior mechanical strength and favorable proton conductivity. In addition, the present invention provides solid polymer electrolyte membranes, electrolyte membrane-electrode assemblies, and solid polymer fuel cells that utilize these components.

The present invention provides a compound having a structure represented by the following Formula I:

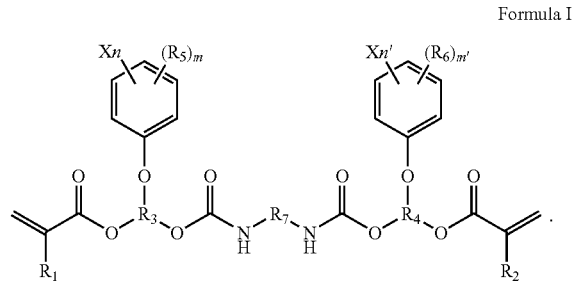

Formula I

In this Formula I, $R_1$ and $R_2$ may be the same or different, each representing a methyl group or a hydrogen atom; $R_3$ and $R_4$ may be the same or different, each representing a substituted or unsubstituted alkanetriyl group having 2 to 10 carbon atoms; $R_5$ and $R_6$ may be the same or different, each representing a substituted or unsubstituted alkyl group having 1 to 6 carbon atoms or a hydrogen atom; $R_7$ represents a substituted or unsubstituted alkylene group having 1 to 6 carbon atoms or a substituted or unsubstituted phenylene group; X represents —$SO_3H$, —$PO_3H_2$, —$PO_4H_2$, —$R_8SO_3H$, —$R_8PO_3H_2$, or —$R_8PO_4H_2$, where $R_8$ represents a substituted or unsubstituted alkylene group having 1 to 6 carbon atoms; and n and n' are each independently an integer of 1 to 5, and m and m' are each independently an integer of 0 to 4, where n +m is 5, and n'+m' is 5.

In addition, the present invention provides a solid polymer electrolyte membrane containing a compound having one or more side chains and a main chain. The side chain includes a structure represented by the following Formula II, and the main chain includes a structure represented by the following Formula III:

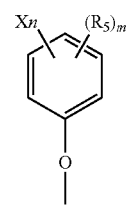

Formula II

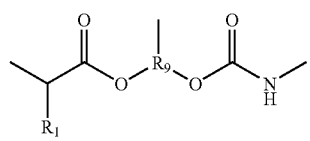

Formula III

In these formulas, $R_5$ represents a substituted or unsubstituted alkyl group having 1 to 6 carbon atoms or a hydrogen atom; X represents —$SO_3H$, —$PO_3H_2$, —$PO_4H_2$, —$R_8SO_3H$, —$R_8PO_3H_2$, or —$R_8PO_4H_2$, where $R_5$ represents a substituted or unsubstituted alkylene group having 1 to 6 carbon atoms; $R_1$ represents a methyl group or a hydrogen atom; $R_9$ represents a substituted or unsubstituted alkanetriyl group having 2 to 10 carbon atoms; and n is an integer of 1 to 5 and m is an integer of 0 to 4, where n+m is 5.

The compound having a main chain and one or more side chains as defined is preferably a polymer of a compound represented by Formula I.

In addition, the present invention provides a solid polymer electrolyte membrane that includes an electrolyte component containing the compound having one or more side chains and a main chain and a porous polymer membrane for holding the electrolyte component. The porous polymer membrane is preferably a polyimide.

Furthermore, the present invention provides an electrolyte-electrode assembly using the solid polymer electrolyte membrane and also provides a solid polymer fuel cell using the solid polymer electrolyte membrane.

Further features of the present invention will become apparent from the following description of exemplary embodiments with reference to the attached drawing.

BRIEF DESCRIPTION OF THE DRAWINGS

This FIGURE is a partial schematic view illustrating a solid polymer fuel cell according to an embodiment of the present invention.

DESCRIPTION OF THE EMBODIMENTS

Embodiments for implementing the present invention will now be described in detail.

The present invention provides a novel compound and further provides a solid polymer electrolyte membrane that has both superior mechanical strength and favorable proton conductivity due to the use of the novel compound. In addition, the present invention provides an electrolyte membrane-electrode assembly and a solid polymer fuel cell using the solid polymer electrolyte membrane. By using the solid polymer electrolyte membrane as an electrolyte membrane for a fuel cell, a solid polymer fuel cell that is highly resistant to fuel permeation is provided.

The compound according to the present invention can be obtained by adding sulfonic acid, phosphoric acid, alkylsulfonic acid, or alkylphosphoric acid to a benzene ring of a urethane(meth)acrylate compound having the benzene rings as side chains. Compound (1) according to the present invention is represented by the following Formula I:

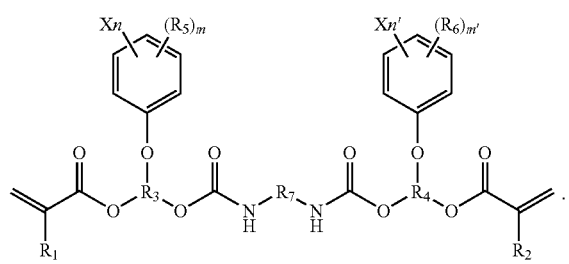

Formula I

In Formula I, $R_1$ and $R_2$ may be the same or different, each representing a methyl group or a hydrogen atom; $R_3$ and $R_4$ may be the same or different, each representing a substituted or unsubstituted alkanetriyl group having 2 to 10 carbon atoms; $R_5$ and $R_6$ may be the same or different, each representing a substituted or unsubstituted alkyl group having 1 to 6 carbon atoms or a hydrogen atom; $R_7$ represents a substituted or unsubstituted alkylene group having 1 to 6 carbon atoms or a substituted or unsubstituted phenylene group; X represents $-SO_3H$, $-PO_3H_2$, $-PO_4H_2$, $-R_8SO_3H$, $-R_8PO_3H_2$, or $-R_8PO_4H_2$, where $R_8$ represents a substituted or unsubstituted alkylene group having 1 to 6 carbon atoms; and n and n' are each independently an integer of 1 to 5, and m and m' are each independently an integer of 0 to 4, where n+m is 5 and n'+m' is 5.

When $R_3$ and $R_4$ are each a substituted alkanetriyl group having 2 to 10 carbon atoms, a hydrogen atom in the side chain of the alkanetriyl group is substituted or a carbon atom is substituted with an atom other than carbon. Examples of the former include an alkanetriyl group containing a substituent such as an alkyl group, an alkyl group having an ether bond, or an alkoxy group. Examples of the compounds in which the carbon atom is substituted include an alkanetriyl group in which a carbon atom is replaced, for example, with an oxygen atom or a nitrogen atom. The number of carbon atoms recited above is that for an alkanetriyl group not having a substituent. The same applies to the substituted groups of $R_5$, $R_6$, $R_7$, and $R_8$.

When n is greater than 1, each individual X independently represents $-SO_3H$, $-PO_3H_2$, $-PO_4H_2$, $-R_8SO_3H$, $-R_8PO_3H_2$, or $-R_8PO_4H_2$. Thus, each respective X may be the same or different. The same applies to X when n' is greater than 1.

In addition, when m is greater than 1, similarly, each individual $R_5$ independently represents a substituted or unsubstituted alkyl group having 1 to 6 carbon atoms or a hydrogen atom. The same applies to $R_6$ when m' is greater than 1.

Compound (1) according to the present invention is a urethane(meth)acrylate compound having benzene rings as side chains. The addition of sulfonic acid, phosphoric acid, alkylsulfonic acid, or alkylphosphoric acid can be relatively readily performed to obtain the compound. This is because these acids are essentially apt to be added to a benzene ring. In addition, since the benzene ring is present in the side chain of the urethane(meth)acrylate compound, the addition is not inhibited by steric hindrance that would present a problem if the ring was present in the main chain. Therefore, the addition can be relatively readily performed.

The urethane(meth)acrylate compound can be prepared, for example, by reactions among hydroxy(meth)acrylate, a polyol, and polyisocyanate. Specifically, urethane(meth)acrylate may be formed by simultaneously mixing these three components, i.e., a polyol, polyisocyanate, and hydroxy(meth)acrylate; or by mixing a polyol and a polyisocyanate to form a urethaneisocyanate intermediate containing one, or more isocyanate groups per molecule and then mixing this intermediate and hydroxy(meth)acrylate, to form urethane(meth)acrylate. In addition, the urethane(meth)acrylate may be formed by mixing a polyisocyanate and hydroxy(meth)acrylate to form a urethane(meth)acrylate intermediate containing one or more isocyanate group per molecule, and then mixing this intermediate and a polyol to form the urethane(meth)acrylate. In this case, either one or both the polyol and the polyisocyanate must have a phenyl group. In the above-mentioned reactions, a catalyst, such as dibutyltin dilaurate, may be used in order to accelerate the reactions. In addition, a commercially available urethane(meth)acrylate prepolymer in which three components, i.e., a polyol, polyisocyanate, and a hydroxy(meth)acrylate, are bound together may be used as the urethane(meth)acrylate compound.

Examples of the hydroxy(meth)acrylate include 2-hydroxyethyl(meth)acrylate, 2-hydroxypropyl(meth)acrylate, 2-hydroxybutyl(meth)acrylate, 2-hydroxyethyl acryloylphosphate, 4-butylhydroxy(meth)acrylate, 2-(meth)acryloyloxyethyl-2-hydroxypropylphthalate, 2-hydroxy-3-(meth)acryloyloxypropyl(meth)acrylate, caprolactone modified 2-hydroxyethyl(meth)acrylate, pentaerythritol tri(meth)acrylate, dipentaerythritol penta(meth)acrylate, ethylene oxide modified hydroxy(meth)acrylate, propylene modified hydroxy(meth)acrylate, ethylene oxide-propylene oxide modified hydroxy(meth)acrylate, ethylene oxide-tetramethylene oxide modified hydroxy(meth)acrylate, and propylene oxide-tetramethylene oxide modified hydroxy(meth)acrylate. In the claims and the specification of this application, the term (meth)acrylate refers to an acrylate or a methacrylate.

Examples of the polyol include p-xylene glycol, m-xylene glycol, styrene glycol, hydrogenated bisphenol A, bisphenol A-ethylene oxide adduct, and bisphenol A-propylene oxide adduct. Thus, polyols preferably have a phenyl group in a side chain. In addition, compounds having a phenyl group added to a side chain of a polyhydric alcohol, diethylene glycol, triethylene glycol, tetraethylene glycol, dipropylene glycol, polyethylene glycol, polypropylene glycol, polybutylene glycol, or polytetramethylene glycol may be used. Examples of the polyhydric alcohol include ethylene glycol, propylene glycol, butylene glycol, 1,4-butanediol, 1,6-hexanediol, neopentyl glycol, cyclohexanedimethanol, polycaprolactone, trimethylolethane, trimethylolpropane, polytrimethylolpropane, pentaerythritol, polypentaerythritol, sorbitol, mannitol, glycerine, and polyglycerine.

Examples of the polyisocyanate include aromatic, aliphatic, cycloaliphatic, and alicyclic polyisocyanates. Among them, polyisocyanates such as trilene diisocyanate (TDI), diphenylmethane diisocyanate (MDI), hydrogenated diphenylmethane diisocyanate (H-MDI), polyphenylmethane polyisocyanate (crude MDI), modified diphenylmethane diisocyanate (modified MDI), hydrogenated xylylene diisocyanate (H-XDI), xylylene diisocyanate (XDI), hexamethylene diisocyanate (HMDI), trimethylhexamethylene diisocyanate (TMHMDI), tetramethylxylylene diisocyanate (m-TMXDI), isophoron diisocyanate (IPDI), norbornane diisocyanate (NBDI), and 1,3-bis(isocyanatomethyl)cyclohexane (H6XDI); and trimer compounds of these polyisocyanates. Reaction products of the polyisocyanates and polyols are preferably used.

The addition of a sulfonic acid group to a benzene ring or an alkyl-substituted benzene ring may be performed by, for example, sulfonation using fuming sulfuric acid or chlorosulfonic acid, but is not limited thereto. When $R_7$ in Formula I is a phenylene group, a sulfonic acid or phosphoric acid may be added not only to the benzene ring of a side chain, but also to the benzene ring of $R_7$ that is in the main chain.

A solid polymer electrolyte membrane according to the present invention will now be described.

A solid polymer electrolyte membrane according to the present invention contains a compound having one more side chains and a main chain. This compound (Compound (2)) has one or more side chains including a structure represented by Formula II and a main chain including a structure represented by Formula III:

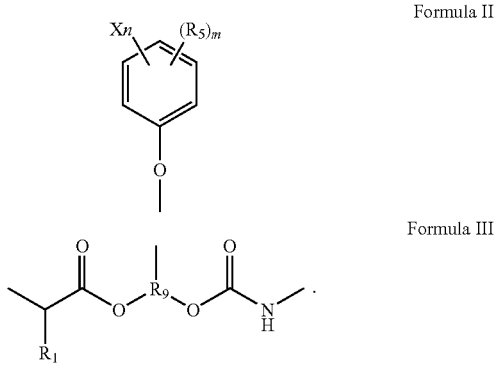

Formula II

Formula III

In these formulas, $R_5$ represents a substituted or unsubstituted alkyl group having 1 to 6 carbon atoms or a hydrogen atom; X represents —$SO_3H$, —$PO_3H_2$, —$PO_4H_2$, —$R_8SO_3H$, —$R_8PO_3H_2$, or —$R_8PO_4H_2$, where $R_8$ represents a substituted or unsubstituted alkylene group having 1 to 6 carbon atoms; $R_1$ represents a methyl group or a hydrogen atom; $R_9$ represents a substituted or unsubstituted alkanetriyl group having 2 to 10 carbon atoms; and n is an integer of 1 to 5 and m is an integer of 0 to 4, where n+m is 5.

Here, when $R_9$ and $R_5$ each have a substituent, the substituents may be the same as those in the above-described compound represented by Formula I. In addition, $R_9$ may be substituted with a substituent having a structure represented by Formula II.

Compound (2), one of compounds that can constitute the solid polymer electrolyte membrane according to the present invention, has a benzene ring in the side chain. Therefore, as in Compound (1) according to the present invention, the addition of sulfonic acid, phosphoric acid, alkylsulfonic acid, or alkylsulfonic acid can be relatively readily performed when Compound (2) is synthesized. In addition, since Compound (2) has these acids in the side chain, the acids can move more freely than when they are present in the main chain. Thus, favorable ion conductivity can be achieved.

Therefore, the polymer electrolyte membrane including Compound (2) shows favorable proton conductivity. In addition, the proton conductivity may be further improved by introducing these acids into the main chain in addition to the side chain.

Furthermore, since the solid polymer electrolyte membrane including Compound (2) has a urethane acrylate structure represented by Formula III in the main chain and a benzene ring in the side chain, the membrane has excellent resistance to compression and swelling. Also, the membrane is flexible. Thus, its mechanical strength is superior. This is because the main chain in the molecule cannot be freely moved by the steric hindrance caused by the benzene ring in the side chain due to the high bonding strength of a urethane bond in the urethane acrylate structure. Thus, the strength of the polymer electrolyte membrane is improved. In the present invention, the term "main chain" refers to the stem, namely, the longest chain among the chains of a compound having a branching structure. The term "side chain" refers to the chains other than the main chain. The side chains bind to the main chain.

Compound (2) may be preferably formed by polymerizing the compound represented by Formula I.

The solid polymer electrolyte membrane according to the present invention is prepared by adhering a solution of a monomer (monomer solution) to be formed into a solid polymer electrolyte membrane to a support and then polymerizing the monomer.

Here, the monomer solution contains at least a monomer and a solvent. Examples of the solvent include amides such as N-methylformamide, N-ethylformamide, N,N-dimethylamide, N-methylacetamide, N-ethylacetamide, N-methylpyrrolidinone, and N-methyl-2-pyrrolidone; and alcohols, such as ethylene glycol, propylene glycol, glycerin, methyl cellosolve, 1,2-butanediol, 1,3-butanediol, 1,4-butanediol, diglycerin, polyoxyalkylene glycol cyclohexanediol, and xylene glycol. These solvents can be used singly or in combination as a solvent mixture comprising two or more compounds. In the present invention, the term "solvent" encompasses a dispersion medium.

Examples of the method for applying a monomer solution to a support include a cast method, a bar coater method, a dip-coating method, and a doctor blade method.

Examples of the support to which the solution is applied include films, plastics, metals, metal oxides, and glass.

Examples of the method for polymerizing a monomer solution into a solid polymer electrolyte membrane include thermal polymerization, photopolymerization, and electron-beam polymerization. When the photopolymerization is conducted, an initiator is necessary. Examples of the initiator include benzoin derivatives such as benzoin methyl ether, benzophenone, thioxanthone, anthraquinone, acridone, and derivatives thereof.

Any monomer of Compound (2) can be used as the monomer for obtaining a polymer electrolyte membrane including Compound (2) according to the present invention. In particular, monomers having a structure represented by Formula I are preferable.

In addition, a copolymer of a monomer of Compound (2) and a monomer other than Compound (2) may be used. Examples of such other monomers include acrylonitrile, methacrylonitrile, vinylsulfonic acid, arylsulfonic acid, styrene sulfonic acid, 2-hydroxyethylmethacrylate acid phosphate, methacryloyloxyethyl acid phosphate, methacryloyltetra(oxyethylene)acid phosphate, methacryloylpenta(oxypropylene)acid phosphate, 4-styrylmethoxybutyl acid phosphate, acryloyloxyethyl acid phosphate, acryloyltetra(oxyethylene)acid phosphate, bismethacryloyloxyethyl acid phosphate, and bisacryloyloxyethyl acid phosphate.

The monomer solution may contain a surface-active agent or filler particles, if necessary, in addition to a solvent and a monomer.

Compound (2) may be used as an electrolyte component by filling a porous polymer membrane with Compound (2). By doing so, the strength of a solid polymer electrolyte membrane can be increased. In such a case, a porous polymer membrane is filled with a monomer solution of Compound (2) and then polymerization is performed to obtain a solid polymer electrolyte membrane.

In the present invention, the term "porous polymer membrane" refers to a polymer membrane having a large number of microscopic pores. These pores may preferably form channels by being suitably connected to each other. This would allow a gas or a liquid to permeate from one surface of the membrane to the other. Here, it is preferable that these pores be nonlinearly connected so that the permeation distance is increased. A substantial increase in permeation distance decreases the crossover of fuel. The degree of permeation can also be controlled by changing the thickness of the porous polymer membrane or the size of the pores.

The thickness and pore size of a porous polymer membrane are not specifically limited and are determined depending on the material, the intended strength of the electrolyte membrane, and the intended characteristics of the solid polymer fuel cell. However, when the electrolyte membrane is used in a general solid polymer fuel cell, the membrane may preferably have a thickness of 15 μm to 150 μm. When the thickness of the porous polymer membrane is less than 15 μm, the effect achieved by increasing the strength of the membrane is small. When the thickness is greater than 150 μm, the permeation distance is too long, which decreases the power generation efficiency.

The porous polymer membrane is formed of a polymer material that is not substantially dissolved nor swollen in methanol and water. Examples of the polymer include resin materials, such as a polyimide, a polyamide, a polyimideamide, a polyolefin, polytetrafluoroethylene, and derivatives thereof. Among these materials, polyimide or its derivative is preferably used because of its insolubility in methanol and water, as well as superior physiological strength, heat resistance, shape stability, and chemical stability.

A porous polymer membrane may be filled with a monomer solution by, for example, coating a prepared mixture solution on the porous polymer membrane or filling the pores in the membrane with the monomer by immersing the membrane in the monomer solution. In this case, the pores may be readily filled with the monomer by applying ultrasonic vibrations or reducing pressure.

A solid polymer fuel cell can be fabricated by using the thus prepared solid polymer electrolyte membrane.

The FIGURE shows a solid polymer fuel cell according to an embodiment of the present invention. The solid polymer fuel cell shown in the FIGURE comprises a solid polymer electrolyte membrane, electrode catalyst layers, diffusion layers, and electrodes.

The fuel cell according to this embodiment comprises electrode catalyst layers 2a and 2b on both surfaces of a solid polymer electrolyte membrane 1, diffusion layers 3a and 3b on the respective outer surfaces of the electrode catalyst layers, and further electrodes 4a and 4b on the outer surfaces of the diffusion layers. In this drawing, an assembly consisting of the electrode catalyst layer 2a, the diffusion layer 3a, and the electrode 4a serves as a fuel electrode (anode) 11. An assembly consisting of the electrode catalyst layer 2b, the diffusion layer 3b, and the electrode 4b serves as an air electrode (cathode) 12.

The electrode catalyst layers 2a and 2b each include at least an electrode catalyst in which a catalyst is supported on conductive carbon.

Examples of the catalytic material include Group VIIIA metals, such as platinum, rhodium, ruthenium, iridium, palladium, and osmium, and alloys of platinum and a Group VIIIA metal other than platinum. When methanol is used as fuel, an alloy of platinum and ruthenium is particularly preferable. The catalyst may have any shape, and may be, for example, a spherical, elliptical, cylindrical, square cylindrical, or dendritic. Among these shapes, a spherical catalyst is preferred. In addition, a smaller average particle size is preferred. Specifically, the average particle size is preferably 0.5 to 20 nm, more preferably 1 to 10 nm. When the average particle size is less than 0.5 nm, the activity of the catalyst particles alone is too high, which makes the treatment difficult. When the average particle size is greater than 20 nm, the surface area of the catalyst is decreased, which results in fewer reaction sites. Hence, the activity may be decreased.

Examples of the conductive carbon include carbon black, carbon fiber, graphite, and a carbon nanotube. The average primary particle size of the conductive carbon is preferably in the range of 5 to 1000 nm, more preferably 10 to 100 nm. However, when the conductive carbon particles are actually used, the particles tend to agglomerate to a certain degree. Therefore, the average secondary particle size becomes larger than the above-mentioned preferable range. In addition, in order to support the catalyst, the specific surface area of the conductive carbon is preferred to be somewhat large. Therefore, the specific surface area is preferably 50 to 3000 $m^2/g$, more preferably 100 to 2000 $m^2/g$.

The catalyst may be supported on the surface of conductive carbon by, for example, a method disclosed in Japanese Patent Laid-Open Nos. 2-111440 or 2000-003712. Specifically, platinum and another noble metal are supported on the surface of conductive carbon by immersing the conductive carbon in a solution containing platinum and this other noble metal and reducing these noble metal ions. Alternatively, a noble metal may be supported on conductive carbon by a vacuum coating method, such as sputtering, by using the noble metal as a target.

The thus prepared electrode catalyst, alone or mixed with a binder, a polymer electrolyte, a water repellent, conductive carbon, or a solvent, is adhered to a polymer electrolyte membrane and a diffusion layer, which is described below.

The diffusion layers 3a and 3b introduce fuel, such as hydrogen, modified hydrogen, methanol, or dimethylether, and an oxidizer, such as air or oxygen, into the electrode catalyst layers and are in contact with electrodes for delivering or receiving electrons. The diffusion layers are preferably made of a conductive porous membrane. Examples of such a membrane include carbon paper, carbon cloth, a composite sheet of carbon and polytetrafluoroethylene. The surfaces and the inner portions of the diffusion layers may be coated with a fluorinated coating material that imparts water-repellency. The diffusion layers may be composed of a plurality of sublayers.

Any electrodes may be used as the electrodes 4a and 4b, as long as the electrodes can efficiently supply the fuel and the oxidizer to the diffusion layers and can deliver and receive electrons to and from the diffusion layers. Examples of the electrode material include metals such as nickel, chromium, copper, platinum, and palladium, and alloys thereof, carbon, carbon dispersed with platinum, and iron.

The fuel cell according to the present invention is fabricated by laminating a solid polymer electrolyte membrane, electrode catalyst layers, diffusion layers, and electrodes as shown in the FIGURE, but the shape and the fabricating process are not limited to those shown and described herein.

EXAMPLES

The present invention will now be further described in detail by referring to the Examples. However, the present invention is not limited to the Examples.

Example 1

Synthesis of Compound (3)

A phenylglycidylether acrylate hexamethylene diisocyanate urethane prepolymer (86.85 g: 0.142 mol) (AH-600 manufactured by Kyoeisha Chemical Co., Ltd.) was dissolved in 450 ml of dichloroethane (Kishida Chemical Co., Ltd.). To this solution, 33.09 g (0.284 mol) of chlorosulfonic acid was dropped at a temperature of 10° C. or less. The resulting solution was reacted at room temperature for 72 hours. After the completion of the reaction, the solvent in the supernatant of the solution was removed by decantation, and then 450 ml of dichloroethane was added to the solution. The resulting solution was stirred and left standing. Then, the solution was stirred again and then left standing. The supernatant of the solution was removed by decantation. The residual glutenous product was dissolved in 200 ml of water and was then dried to obtain 83.04 g of Compound (3) represented by the following structural formula 1. NMR analysis confirmed Compound (3) had a structure represented by the following structural formula 1:

Example 2

Synthesis of Compound (4)

Compound (4) represented by the following structural formula 2 was prepared in the same manner as Compound (3) in Example 1, except that 87.70 g (0.142 mol) of a phenylglycidylether acrylate toluene diisocyanate urethane prepolymer (AT-600 manufactured by Kyoeisha Chemical Co., Ltd.) was used instead of 86.85 g (0.142 mol) of the phenylglycidylether acrylate hexamethylene diisocyanate urethane prepolymer (AH-600 manufactured by Kyoeisha Chemical Co., Ltd.). Compound (4) was also confirmed by NMR analysis to have a structure represented by the following structural formula 2:

Structural formula 2

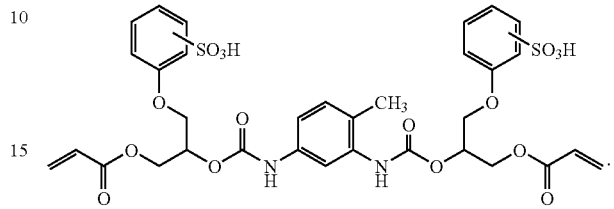

Example 3

Preparation of Solid Polymer Electrolyte Membrane 1

A monomer solution was prepared by mixing 9 g of the resulting Compound (3) with 20 g of vinylsulfonic acid (Asahi Kasei Finechem Co., Ltd.). This solution was applied to the surface of a PET film to obtain a coating having a thickness of 50 μm. The coating was irradiated with electron beams at an accelerating voltage of 180 kV at a radiation dose of 50 kGy by using an electron beam irradiation apparatus (CB250/15/180L manufactured by Iwasaki Electric Co., Ltd.) for polymerization. By peeling the coating from the PET film, a solid polymer electrolyte membrane 1 was obtained.

Example 4

Preparation of Solid Polymer Electrolyte Membrane 2

A solid polymer electrolyte membrane 2 was prepared in the same manner as in Example 3, except that 9 g of Compound (4) was used instead of Compound (3).

Structural formula 1

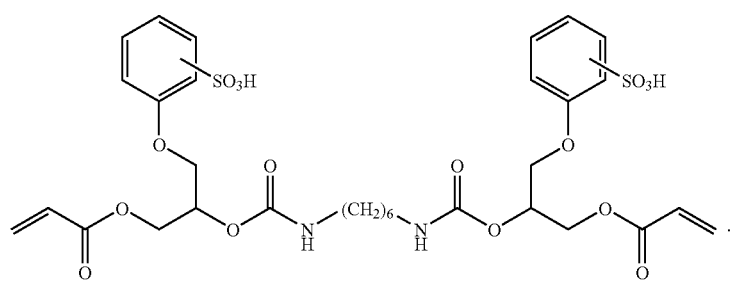

Example 5

Preparation of Solid Polymer Electrolyte Membrane 3

A monomer solution was prepared by stirring a mixture of 50 g of Compound (3) and 100 ml of dimethyl sulfoxide (Kishida Chemical Co., Ltd.), so that Compound (3) dissolved in dimethyl sulfoxide. To this solution, 0.1 to 1.0 wt % of acetophenone was added as a photopolymerization initiator to prepare a photopolymerization initiator-containing prepolymer composition. This photopolymerization initiator-containing prepolymer composition was applied to the surface of a Teflon sheet, so that the resulting coating had a thickness of 70 μm. Furthermore, after an irradiation with light at 1.4 J/cm² by using a light irradiation apparatus (EX250-W manufactured by HOYA-SCHOTT Co., Ltd.), the Teflon sheet was peeled off. Thus, a solid polymer electrolyte membrane 3 was obtained.

Example 6

Preparation of Solid Polymer Electrolyte Membrane 4

A mixture solution was prepared by adding 20 g of acrylonitrile to 9 g of Compound (3). A porous polyimide membrane having a thickness of 15 μm and an average pore size of 0.1 μm was immersed in this solution in a container. Then, the immersed membrane in the container was sonicated for 5 minutes. Then, polyimide membrane was removed from the container and placed on a flat and smooth SUS plate, and was irradiated with electron beams at an accelerating voltage of 200 kV at a radiation dose of 50 kGy by using an electron beam irradiation apparatus (CB250/15/180L manufactured by Iwasaki Electric Co., Ltd.) for polymerization. Thus, a solid polymer electrolyte membrane 4 was obtained.

Comparative Example 1

Preparation of Solid Polymer Electrolyte Membrane 5

A compound represented by the following structural formula 4 was prepared in the same manner as the compound of structure formula 1 in Example 1, with the exception that 86.85 g of an EO adduct diacrylate of bisphenol A (light acrylate BP-10EA manufactured by Kyoeisha Chemical Co., LTD., average molecular weight: 936) represented by the following structural formula 3 was used instead of 86.85 g of the phenylglycidylether acrylate hexamethylene diisocyanate urethane prepolymer (AH-600 manufactured by Kyoeisha Chemical Co., Ltd.). Then, a solid polymer electrolyte membrane 5 was prepared in the same manner as in Example 3, except a compound represented by the following structural formula 4 was used instead of Compound (3).

Structural formula 3:

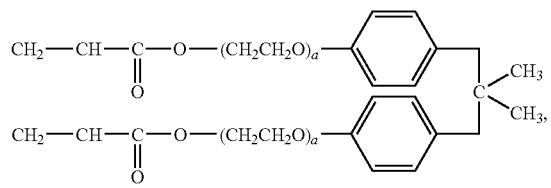

wherein a+b≈10.

Structural formula 4:

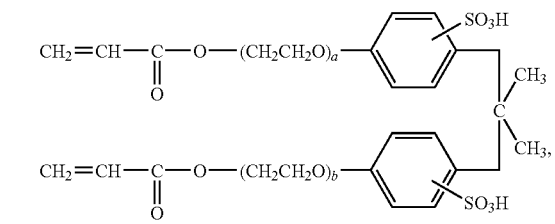

wherein a+b≈10.

Comparative Example 2

Preparation of Solid Polymer Electrolyte Membrane 6

A compound represented by the following structural formula 6 was prepared in the same manner as compound of structural formula (1) in Example 1, with the exception that 86.85 g of a neopentyl glycol acrylic acid benzoic acid ester (light acrylate BA-104 manufactured by Kyoeisha Chemical Co., LTD., average molecular weight: 262) represented by the following structural formula 5 was used instead of 86.85 g of the phenylglycidylether acrylate hexamethylene diisocyanate urethane prepolymer (AH-600 manufactured by Kyoeisha Chemical Co., Ltd.). Then, a solid polymer electrolyte membrane 6 was prepared in the same manner as the solid polymer electrolyte membrane 1 in Example 3, except a compound represented by the following structural formula 6 was used instead of Compound (3).

Structural formula 5:

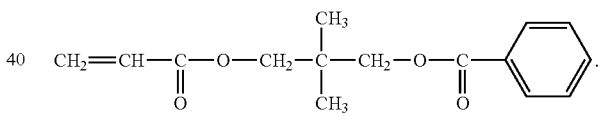

Structural formula 6:

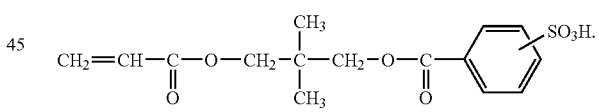

Comparative Example 3

A solid polymer electrolyte membrane, Nafion 112 (50 μm) commercially available from DuPont, was used without modification.

Evaluation

Bending Test

A 3 cm square test piece was cut out from each of the obtained polymer electrolyte membranes. Holding one side edge of the test piece, the test piece was folded 180° along a center line and was then returned to its original planar shape. This step was repeated 100 times, and then the surface state of the membrane was observed. Table 1 shows the results.

Proton Conductivity

A 3 cm by 2 mm test piece was cut out from each of the obtained polymer electrolyte membranes and fixed on platinum electrodes arranged at an interval of 1 cm. Then, the proton conductivity of each polymer electrolyte membrane was measured by using an impedance analyzer SI1260 (Solartron) in an environment at 50° C. and a relative humidity of 95%. Table 1 shows the results.

TABLE 1

| EXAMPLE | Bending Test (after 100 times repetition) | Proton Conductivity [S/cm] |
|---|---|---|
| EXAMPLE 3 | No change | $1.2 \times 10^{-2}$ |
| EXAMPLE 4 | No change | $7.8 \times 10^{-3}$ |
| EXAMPLE 5 | No change | $4.5 \times 10^{-3}$ |
| EXAMPLE 6 | No change | $6.4 \times 10^{-3}$ |
| COMPARATIVE EXAMPLE 1 | Clouding occurred at fold line | $2.5 \times 10^{-3}$ |
| COMPARATIVE EXAMPLE 2 | Cracks occurred at fold line | $3.2 \times 10^{-3}$ |
| COMPARATIVE EXAMPLE 3 | No change | $2.1 \times 10^{-2}$ |

Fuel Cell

Two pieces of carbon paper (TGP-H-060 manufactured by Toray Industries, Inc.) having a thickness of 0.2 mm and a size of 5 cm square were prepared. A platinum catalyst (TEC10E50E manufactured by Tanaka Kikinzoku Kogyo K.K.) as a catalyst for an fuel electrode was supported on one piece of the carbon paper at 1.5 mg/cm$^2$ to prepare a fuel electrode. A platinum/ruthenium catalyst (TEC61E54 manufactured by Tanaka Kikinzoku Kogyo K.K.) as a catalyst for an oxidizer electrode was supported on the other piece of the carbon paper at 1.5 mg/cm$^2$ to prepare an oxidizer electrode (air electrode).

A 7 cm square test piece was cut out from each of the solid polymer electrolyte membranes obtained in Examples 3 to 6 and Comparative Examples 1 to 3. The test piece of the solid polymer electrolyte membrane was sandwiched by the fuel electrode and the oxidizer electrode prepared above, and was pressed at a temperature of 120° C. and a pressure of 8 MPa to fabricate an assembly of the membrane, the electrodes, and the catalysts. Since the solid polymer electrolyte membrane of Comparative Example 2 cracked during the pressing process, it could not be used in an electrolyte membrane-electrode assembly.

The obtained electrolyte membrane-electrode assembly was installed in a test cell of a direct methanol fuel cell (EFC25-01DM manufactured by ElectroChem, Inc.) to fabricate a solid polymer fuel cell. Then, a current-voltage curve was obtained by supplying 5% methanol aqueous solution as a fuel and oxygen as an oxidizer to the cell at a cell temperature of 70° C.

Table 2 shows terminal voltages at the start and after 10 minutes of discharge at a current density of 0.12 A/cm$^2$.

TABLE 2

|  | At the start | After 10 minutes |
|---|---|---|
| EXAMPLE 3 | 0.57 | 0.56 |
| EXAMPLE 4 | 0.53 | 0.52 |
| EXAMPLE 5 | 0.52 | 0.52 |
| EXAMPLE 6 | 0.56 | 0.56 |
| COMPARATIVE EXAMPLE 1 | 0.52 | 0.38 |
| COMPARATIVE EXAMPLE 2 | — | — |
| COMPARATIVE EXAMPLE 3 | 0.39 | 0.39 |

It can be observed from the results shown in Table 1 that the electrolyte membranes of Examples 3 to 6 each achieve good proton conductivity and retain sufficient mechanical strength. On the other hand, the electrolyte membranes of Comparative Examples 1 and 2 have cracks or clouding generated at fold lines. This suggests that the mechanical strength of these polymer electrolyte membranes is insufficient.

It can be observed from the results shown in Table 2 that each of the polymer electrolyte membranes in Examples 3 to 6 has a terminal voltage higher than that of the Nafion membrane of Comparative Example 3. This suggests that while the polymer electrolyte membranes in Examples 3 to 6 have lower proton conductivity than that of the membrane in Comparative Example 3, each membrane in Examples 3 to 6 favorably decreases the crossover of methanol and thereby increases the terminal voltage.

Further, while the membrane of Comparative Example 1 had a high terminal voltage immediately after the start of power generation, the voltage was low 10 minutes later. This may be due to the mechanical strength of the membrane being insufficient to withstand the compression and swelling of the membrane, which is caused by the flow of the fuel in the cell. Thus, the membrane starts to crack, thereby decreasing the voltage. The Nafion membrane of Comparative Example 3 had good proton conductivity. However, the crossover of methanol was high, and therefore, the terminal voltage was low.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-375170 filed Dec. 27, 2005, which is hereby incorporated by reference herein in its entirety.

What is claimed is:

1. A solid polymer electrolyte membrane comprising a compound having one or more side chains and a main chain, wherein the side chain comprises a structure represented by Formula II and the main chain comprises a structure represented by Formula III:

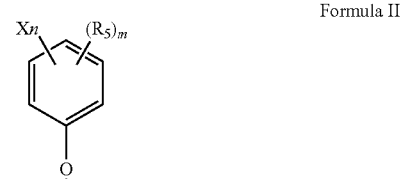

Formula II

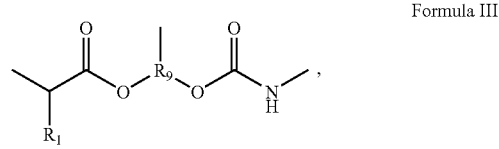

Formula III wherein $R_5$ represents a substituted or unsubstituted alkyl group having 1 to 6 carbon atoms or a hydrogen atom; X represents —$SO_3H$, —$PO_3H_2$, —$PO_4H_2$, —$R_8SO_3H$, —$R_8PO_3H_2$, or —$R_8PO_4H_2$, where $R_8$ represents a substituted or unsubstituted alkylene group having 1 to 6 carbon atoms; $R_1$ represents a methyl group or a hydrogen atom; $R_9$ represents a substituted or unsubstituted alkanetriyl group having 2 to 10 carbon atoms; and n is an integer of 1 to 5 and m is an integer of 0 to 4, where n+m is 5.

2. The solid polymer electrolyte membrane according to claim 1, wherein the compound having one more side chains and a main chain is a polymer of a compound represented by Formula I:

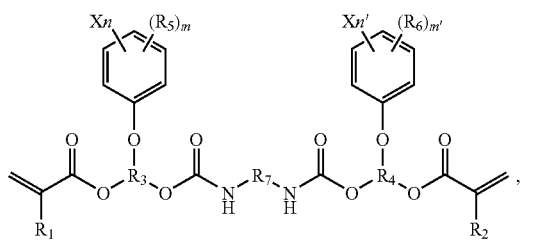

Formula I wherein, $R_1$ and $R_2$ may be the same or different, each representing a methyl group or a hydrogen atom; $R_3$ and $R_4$ may be the same or different, each representing a substituted or unsubstituted alkanetriyl group having 2 to 10 carbon atoms; $R_5$ and $R_6$ may be the same or different, each representing a substituted or unsubstituted alkyl group having 1 to 6 carbon atoms or a hydrogen atom; $R_7$ represents a substituted or unsubstituted alkylene group having 1 to 6 carbon atoms or a substituted or unsubstituted phenylene group; X represents —$SO_3H$, —$PO_3H_2$, —$PO_4H_2$, —$R_8SO_3H$, —$R_8PO_3H_2$, or —$R_8PO_4H_2$, where $R_8$ represents a substituted or unsubstituted alkylene group having 1 to 6 carbon atoms; and n and n' are each independently an integer of 1 to 5, and m and m' are each independently an integer of 0 to 4, where n+m is 5 and n'+m' is 5.

3. The solid polymer electrolyte membrane according to claim 1, comprising an electrolyte component and a porous polymer membrane for holding the electrolyte component, wherein the electrolyte component comprises the compound having one or more side chains and the main chain.

4. The solid polymer electrolyte membrane according to claim 3, wherein the porous polymer membrane is a polyimide.

5. An electrolyte membrane-electrode assembly comprising a solid polymer electrolyte membrane according to claim 1 and an electrode.

6. A solid polymer fuel cell comprising a solid polymer electrolyte membrane according to claim 1.

* * * * *